(12) United States Patent
Marold et al.

(10) Patent No.: US 9,151,413 B2
(45) Date of Patent: Oct. 6, 2015

(54) BUSHING AND METHOD FOR PRODUCING SUCH A BUSHING

(75) Inventors: Uwe Marold, Bodenkirchen (DE); Peter Füssl, Vilsbiburg (DE); Christian Binder, Gangkofen (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 287 days.

(21) Appl. No.: 13/696,095

(22) PCT Filed: May 5, 2011

(86) PCT No.: PCT/EP2011/057197
§ 371 (c)(1),
(2), (4) Date: Jan. 8, 2013

(87) PCT Pub. No.: WO2011/138390
PCT Pub. Date: Nov. 10, 2011

(65) Prior Publication Data
US 2013/0126230 A1 May 23, 2013

(30) Foreign Application Priority Data
May 5, 2010 (DE) .......................... 10 2010 028 592

(51) Int. Cl.
*F16L 5/10* (2006.01)
*B60R 16/02* (2006.01)

(52) U.S. Cl.
CPC ............... *F16L 5/10* (2013.01); *B60R 16/0222* (2013.01)

(58) Field of Classification Search
CPC ........... H02G 3/22; H02G 3/088; H02G 3/04; H02G 3/08; H02G 3/38; H01B 17/301; H01B 17/306; H01B 13/01263; H01B 17/58; B60R 16/0222; F16L 5/02; F16L 5/10
USPC ...... 16/2.1, 2.2; 174/151, 152 G, 152 R, 135, 174/153 G, 652; 248/56, 96; 264/46.4; 439/274, 275, 587, 604
See application file for complete search history.

(56) References Cited

U.S. PATENT DOCUMENTS

| 7,026,549 | B1 * | 4/2006 | Smutny et al. ................. 248/56 |
| 7,895,709 | B2 * | 3/2011 | Shishikura ....................... 16/2.1 |
| 2005/0054238 | A1 * | 3/2005 | Matkovich et al. ........... 439/587 |
| 2008/0011502 | A1 | 1/2008 | Pfister |

FOREIGN PATENT DOCUMENTS

| DE | 4325420 A1 * | 2/1995 | ............... H02G 3/22 |
| DE | 100 53 115 C1 | 4/2002 | |
| DE | 10 2005 025780 A1 | 12/2006 | |

(Continued)

*Primary Examiner* — Timothy Thompson
*Assistant Examiner* — Guillermo Egoavil
(74) *Attorney, Agent, or Firm* — Wolf, Greenfield & Sacks, P.C.

(57) ABSTRACT

The invention relates to a bushing for sealing a strand-shaped element (10), in particular one or more lines, in an opening (14) of a wall (15), comprising a foamed sealing body (40), which completely surrounds the strand-shaped element (10) and defines a volume, and a fastening body (20) for fastening the bushing to the wall (15), characterised in that the fastening body (20) is made of a different material than the sealing body (40), the volume defined by the scaling body (40) is delimited on one side at least along a portion of said side and is connected at least by bonding to the sealing body (40) along said portion.

15 Claims, 3 Drawing Sheets

(56) References Cited

FOREIGN PATENT DOCUMENTS

| | | | |
|---|---|---|---|
| DE | 102010039225 A1 | 3/2011 | |
| EP | 0651485 A1 * | 10/1994 | ............... H02G 3/22 |
| EP | 0 651 485 A1 | 5/1995 | |
| FR | 2671916 A1 * | 7/1992 | ....... H01B 13/01263 |
| FR | 2671916 A1 | 7/1992 | |
| GB | 988663 A * | 4/1965 | |
| JP | 09217867 A * | 8/1997 | ................ F16L 5/02 |
| JP | 11127527 A * | 5/1999 | ............... H02G 3/22 |
| JP | 2009-296741 A | 12/2009 | |

* cited by examiner

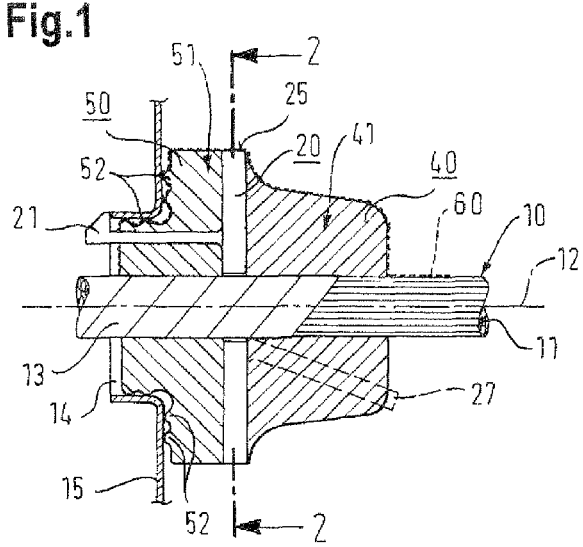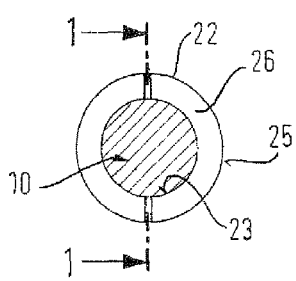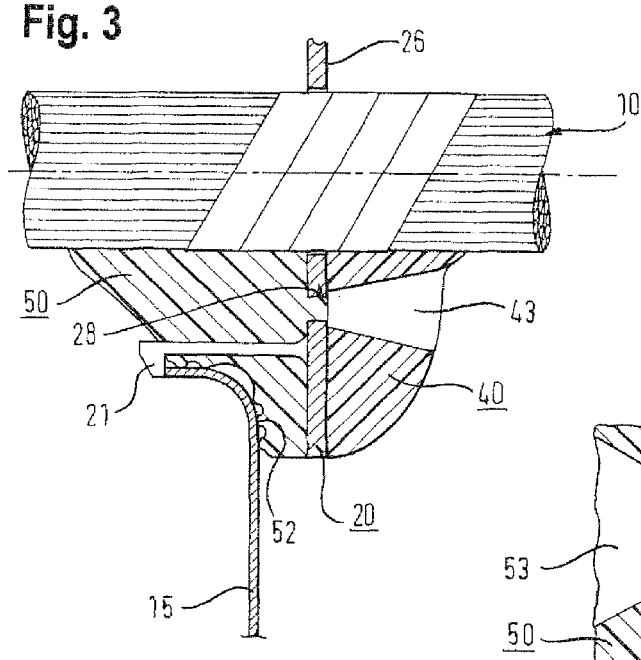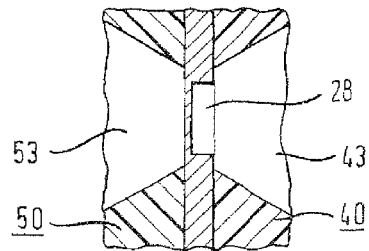

BUSHING AND METHOD FOR PRODUCING SUCH A BUSHING

The present invention relates to a bushing for sealing a strand-shaped element, in particular a set of conductors with one or more conductors, in an opening in a wall, in particular a bodywork panel of a motor vehicle. In particular, the present invention concerns a bushing with a foamed seating body, which completely surrounds the strand-shaped element. The present invention also concerns a method for manufacturing a bushing of this type.

Bushings with a foamed sealing body wherein the foamed sealing body completely surrounds the strand-shaped element are known from the prior art. With such bushings, water ingress in the longitudinal direction of the strand-shaped element (water-tightness relative to longitudinal water ingress) is to be prevented by sealing said strand-shaped element. A bushing of this type is known, for example, from DE 101 29 086 A1.

In order to fasten the bushing described in that document to the wall surrounding the opening, the foamed sealing body has a fastening region made of the same foamed material which, with regard to the use thereof for ensuring longitudinal water-tightness, is made of a soft elastic material and therefore does not have sufficient stiffness for fastening. In order to provide this region with the necessary strength, said region is strengthened with a plurality of insert parts which are subsequently inserted into the sealing body.

This has the disadvantage that assembly is complex, is difficult to automate and is therefore time-intensive and cost-intensive.

Furthermore, depending on the particular application, bushings of this type must meet the requirement of sealing the strand-shaped element against longitudinal water ingress, of guiding the strand-shaped element, for example, to avoid contact with other components and/or of sealing two installation spaces separated from one another by the wall, for example the engine compartment and the passenger cabin, in the region of the opening. In order to guide the strand-shaped element, the bushing must be configured relatively stiff Such stiffness, however, makes necessary undesirably high assembly forces for mounting the bushing in the wall opening. Such forces can only be partially compensated for by a suitable configuration of the sealing geometry for sealing relative to the wall. The narrow material gap necessary for stiffness also increases the weight of the bushing. The partially contradictory requirements can only be met through a compromise and lead, in part, to a significantly increased effort during assembly by the vehicle manufacturer (requiring special assembly tools and an increased monitoring effort, etc.).

In view of the above considerations, it is an object of the present invention to provide a bushing which aids assembly by requiring few parts, with which a high level of automation can be achieved, but which also fulfils at least one of the aforementioned requirements of longitudinal water-tightness, guidance of the strand-shaped element and sealing two installation spaces separated by the wall in the region of the interface of the opening. It is a further object of the present invention to provide a corresponding automated manufacturing method for a bushing of this type.

This aim is achieved according to the invention with a bushing having the features of claim 1 and with a method having the features of claim 13. Advantageous further developments of the present invention are disclosed in the subclaims.

The present invention is based on the concept of making the foamed sealing body and the fastening region in one piece, but from different materials. The materials are selected such that they meet the requirements for the respective usage. Thus the fastening body is made from a relatively stiff material or a stiffer material than the sealing body, in order to keep the assembly forces low and thereby to reduce the effort required for assembly. Furthermore, the fastening body can assume a guiding function for the strand-shaped element. The sealing body, however, is selected to be relatively elastic to meet the requirements for sealing, either with respect to longitudinal water ingress and/or for sealing relative to the wall in the region of the opening, in order to be able to provide an optimum sealing effect. The fastening body is preferably provided with a double function during manufacturing by serving to form the hollow chamber (cavity) in the molding tool for the foamed sealing body, i.e. forms the hollow chamber together with the molding tool, into which the foam material is introduced.

The bushing of the present invention is mounted on the strand-shaped element (also designated 'conductor set' below) for example during the creation of a cable loom for a vehicle during cable assembly, and the cable loom together with the bushing is supplied to the vehicle manufacturer and there installed in the vehicle. In the process, the bushing is fixed into the opening in the wall. Purely by way of example, in the following description, a bushing for sealing a conductor set with one or more conductors is considered. However, it should be understood that the bushing can also be used for other strand-shaped elements, purely by way of example, for hydraulic or pneumatic conduits. The use of the present bushing for sealing in an opening of a wall is also not restricted to use in motor vehicles or to openings in a bodywork panel. Rather, openings in, for example, housings made of plastics or other materials, into which the bushing can be inserted are also conceivable.

The bushing according to the invention comprises a foamed sealing body (first sealing body) which completely surrounds the strand-shaped element (e.g. the conductor set) and defines a volume. In other words, the foamed sealing body encloses the strand-shaped element along part of the longitudinal extent thereof so as to surround the entire circumference of the strand-shaped element. By the use of a foamed sealing body, a seal is achieved in per se known manner between the sealing body and the conductor set in the longitudinal direction of the conductor set (providing longitudinal water-tightness). The conductor set and/or the foamed sealing body can have a circular cross-sectional form. The sealing body can also narrow in the longitudinal direction, at least at one of the ends thereof, from a region with a largest diameter to a region with a smallest diameter, The foamed sealing body defines a volume that is limited at the radial inner side thereof by the conductor set. Preferably, the sealing body is formed from a polyurethane foam. In order to improve adhesion with the fastening body, an additive known from the prior art can be added to the polyurethane foam.

The bushing according to the invention also comprises a fastening body for fastening the bushing to the wall. This can be realized with any desired fastening elements, such as locking hooks, screw points or preparations therefor, and the like, which are suitable for fixing the fastening body in the desired installation position thereof at the wall. In addition, the fastening elements must ensure that the necessary pressing force can be provided for a seal between the bushing and the wall, insofar as a further (second) sealing body (see later) is provided for this purpose.

The fastening body of the present invention is made of a different material from that of the sealing body, As mentioned above, it is preferable for the fastening body to be made of a relatively stiff material, that is, stiffer, harder material than that of the sealing body. Thus the foamed sealing body is made of a material which is sufficient for the underlying function of sealing, whereas the fastening body primarily serves the function of holding and pressing.

Advantageously, the fastening body is made of a polyacrylate plastics material (PA) polycarbonate (PC), an acrylonitrile butadiene styrene copolymer (ABS) or a mixture of the aforementioned plastics materials. Furthermore, by using a relatively light material for the fastening body, the foam material for the sealing body can be reduced and thereby, the component weight and the manufacturing time during foaming can be reduced. Furthermore, the fastening body made from a relatively stiff, hard material offers the possibility of realizing cable guides and winding aids, etc. in the product itself, so that no additional elements are required therefor. Furthermore, the fastening body is configured so as to delimit the volume defined by the sealing body at least at one side and at least along a partial region of said side. The fastening body is connected at least in fused manner to the sealing body along said partial region, so that the bushing is a one-piece component. The expression 'fused' is used to mean a fused connection such that no additional intermediate layers, for example, an adhesive layer, are required, but rather the joining is achieved with a fused bond or, preferably, an adhesive bond of the material of the foamed sealing body to the material of the fastening body. According to one embodiment, the fastening body delimits the volume defined by the sealing body in only one direction, for example, in the radial direction or in the axial direction. With the embodiment according to the invention, a bushing can be produced which better fulfils the aforementioned requirements and is better suited to the compromise of achieving the partially contradictory aims than the prior art and, furthermore, of production with a high degree of automation. Moreover, the strand-shaped element in the region of the passage through the fastening body can be wrapped round with a band-shaped material in order to prevent damage in this region.

According to a particularly preferred embodiment of the present invention, the fastening body has a double function and serves, during the manufacturing process, in cooperation with a molding tool, to form the hollow chamber into which the foam material for the sealing body is introduced. Therefore, the fastening body preferably has, at least at one end of the partial region (e.g. in the radial direction or the axial direction), a sealing region where the fastening body is connected in a fused manner to the sealing body. The sealing region preferably extends perpendicularly to the course of the partial region in which said sealing region is connected, as already stated, in fused manner to the sealing body. The sealing region serves to seal relative to the molding tool during manufacturing, the volume of the sealing body being pre-determined by the fastening body, the molding tool and the conductor set.

A further (second) sealing body which is arranged at least along the periphery of the fastening body and is configured for sealing relative to the wall is preferably provided.

In a preferred embodiment of the present invention, said further (second) sealing body can serve a double function by extending as far as the aforementioned sealing region of the fastening body and forming the sealing means in said sealing region. Alternatively thereto, it is also conceivable to form the sealing means 25 with a sealing contour, e.g. one or more "sealing lips" made of the same material as the fastening body, which are pressed together when the molding tool is closed and seal relative to the internal surface of the molding shell of the tool. Preferably, the further sealing body can be connected in one piece; for example, fused to the fastening body. This aim can be achieved in a separate two-component injection molding process, the fastening body being made from a relatively hard plastics material (e.g. PC, ABS, PC-ABS, PA), whilst the further sealing body is injection molded on from a thermoplastic material (e.g. a TPE, for example, TPE-S, TPE-U, TPE-V) in a two-component injection molding process and is thus formed integrally and/or fused with the fastening body.

The further (second) sealing body can be made of a different material from that of the fastening body and can be connected in a fused manner to the fastening body. In addition, it is also conceivable for the further sealing body to be made of a different material from that of the (first) sealing body and preferably also as a foamed sealing body.

It may be preferable that the fastening body substantially separates the (first) sealing body and the further (second) sealing body from one another. I.e. here also the fastening body can perform a double function by subdividing the cavity (the hollow chamber) of the molding tool during manufacturing. The two hollow chambers thus created can be filled with different materials. The materials can be matched to one another so as to meet optimally the requirements for longitudinal water-tightness and for sealing relative to the wall and for separation of the chambers situated on the two opposing sides of the wall. The expression 'substantially' should be understood to mean that a certain lack of seal can certainly be present in the region of the separating site, since mixing of the different foam materials in a partial region must not necessarily have negative effects. By means of suitable control of the process, the mixing zone can also be delimited. In this embodiment, the fastening body similarly delimits the volume defined by the further (second) sealing body along at least a partial region and, in said partial region, is preferably connected in a fused manner to the further (second) sealing body (similarly to the first sealing body).

According to the above embodiment, it is particularly preferred that the fastening body has an annular wall which extends radially and has a perforation for accommodating the strand-shaped element. I.e. the radially inwardly arranged end of the annular wall seals relative to the strand-shaped element (the conductor set), whereas the end arranged radially outwardly forms the sealing region.

In addition, it is conceivable with this embodiment, that a leadthrough preparation for a further strand-shaped element is provided, penetrating the sealing body, the further sealing body and the annular wall only partially in the axial direction. This can be achieved with a cut-away of the sealing body or the further sealing body and the annular wall or by a cut-away of the sealing body and the further sealing body and a partial cut-away of the annular wall. In the latter embodiment, it is preferred that the annular wall is weakened to a residual wall thickness and/or to provide said wall with a predetermined breaking point. In this way, for later fitting of further conductors, for example, for repairs, perforations can be achieved by means of which a further strand-shaped element, for example, a conductor, can be pulled through the bushing. Following leadthrough, the region can be closed with a conventional bushing or with a suitable curable sealing compound.

As an alternative to the annular wall, it is also conceivable that the fastening body has a cylindrical wall which partially accommodates the sealing body and, in the radial direction, delimits the volume defined by the sealing body along a partial region. This means that, as early as the manufacturing process, the cylindrical wall defines a hollow chamber, into which the foam material is introduced. The molding tool borders on said hollow chamber and augments the hollow chamber to a larger hollow chamber, so that the sealing body extends beyond the cylindrical wall in the axial direction. Alternatively, the tool can merely close the cylinder at both ends in order to form the hollow chamber for the (first) sealing body.

In the above embodiment, it is particularly preferable that the cylindrical wall has the sealing region at least at one end face, that is, at both openings of the cylinder.

In order not to have to thread in the conductors laboriously, it is also preferred to construct the fastening body from at least two circular segments. Said segments can be inserted into the molding tool separately. Then the conductor set is inserted into the molding tool. By closing the molding tool, the circular segments are brought together round the conductor set and can seal relative to one another by means of a suitable geometry in the form, for example, of a groove or the like. Here again, complete sealing is not necessary, since mixing does not necessarily have negative effects.

Apart from the bushing according to the invention, the present invention also proposes a method for manufacturing a bushing of this type. The method comprises the steps of inserting the fastening body and/or the circular segments of the fastening body into a molding tool. At the same time or subsequently, the strand-shaped element is inserted into the molding tool and then the tool is closed. Following closing, a hollow chamber (cavity) is delimited by the strand-shaped element, the fastening body and the molding tool. A foam material is then introduced into the hollow chamber and foamed, so that the hollow chamber is filled with foam to form the sealing body.

Depending on the design of the fastening body, the hollow chamber can be divided by the fastening body into two hollow chambers and different foam materials, adapted to the function of the sealing body and/or of the further sealing body, can be introduced into the different hollow chambers, so that the formation of the (first) sealing body and of the further (second) sealing body can be carried out in the same tool and method step.

Particularly preferably, the hollow chamber is sealed at the interface between the tool and the fastening body following closing of the molding tool, by the sealing region of the fastening body.

Further advantages and features of the present invention which can be implemented together with one or more of the above-mentioned features, insofar as the features do not contradict one another, are disclosed in the following description of preferred embodiments of the present invention. This description refers to the accompanying drawings, in which:

FIG. 1 shows a cross-section through a bushing according to a first embodiment of the present invention along the line 1-1 in FIG. 2;

FIG. 2 shows a cross-section through the bushing of FIG. 1 along the line 2-2;

FIG. 3 shows a cross-section through a bushing according to a further embodiment of the present invention, said cross-section being similar to that of FIG. 1;

FIG. 4 shows an alternative to the embodiment of FIG. 3 on an enlarged scale;

Figure 5:
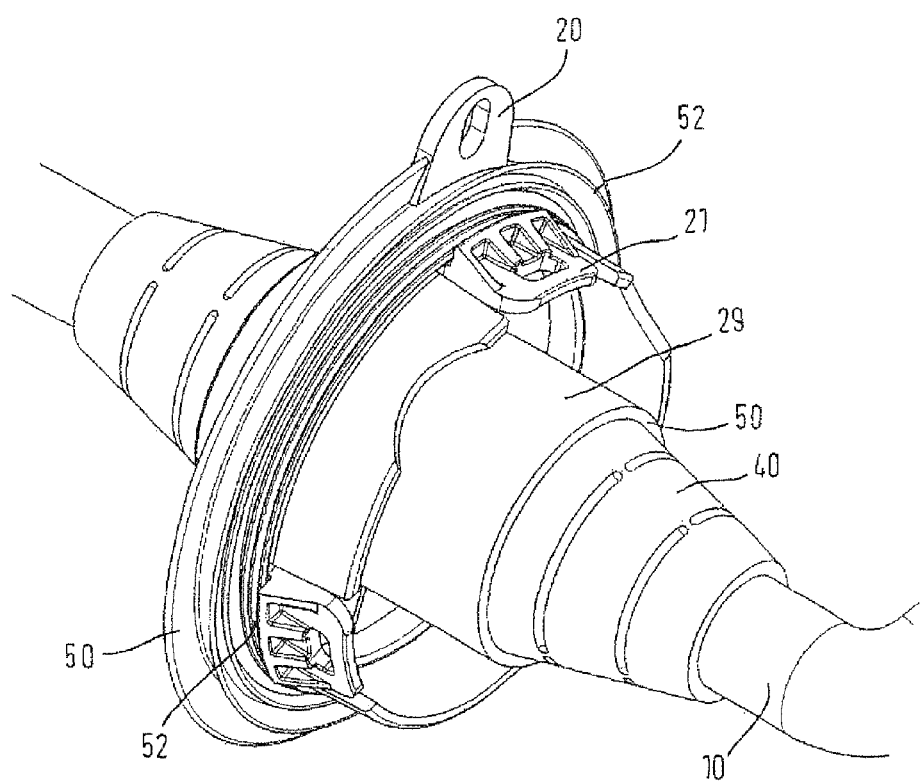
FIG. 5 shows an alternative embodiment of a bushing according to the invention in a perspective view.

The following description of the embodiments of the present invention relates, purely by way of example, to the use of the bushing according to the invention for sealing a conductor set of a motor vehicle in an opening of a bodywork panel. It should be understood, however that, based on the above embodiments, the bushing according to the invention can also be used differently.

FIG. 1 shows a conductor set 10 with a plurality of conductors 11. The conductor set 10 has a longitudinal extent with a longitudinal central axis 12. The longitudinal central axis 12 corresponds to the axial direction. The conductor set 10 is wrapped, at least in a partial region of the fastening region 20 which will be described later, with a cable wrapping tape 13 which is known to persons skilled in the art.

The bushing in FIG. 1 comprises a fastening body 20, a first sealing body 40 and a second sealing body 50. The bushing is configured for fastening in a circular opening 14 in a bodywork panel 15 of a motor vehicle. In order to fasten the bushing to the bodywork panel 15, the fastening body 20 has a fastening device 21. As shown in FIG. 1, said fastening device can consist of a plurality of locking hooks which engage behind the bodywork panel 15 in the region of the opening 14. One locking hook 21 of this type is shown in FIG. 1. At least two, preferably three or more such locking hooks are to be provided in order to ensure a secure fixing of the bushing to the bodywork panel 15. As FIG. 2 shows schematically, the fastening body 20 is made from two semicircular segments 22, 24, which form a radially inwardly arranged circular through opening 23 for the cable set 10. The diameter of the opening 23 can also be adapted to the external diameter of the cable set 10 possibly with a wrapping 13, in order to ensure sufficient sealing between the surface forming the opening 23 and the external surface of the cable set 10. The radially externally arranged surface 25 provides a sealing region, which is sealed during manufacturing with a tool half, indicated in FIG. 1 by the dot-dashed line 60. The width of the surface 25 in the axial direction of FIG. 1, that is, the width of the sealing surface of the sealing region is at least 1.5 mm, preferably at least 2 mm, The fastening body 20 in FIG. 1 is made from an annular wall 26 with the external surface 25 and the opening 23 as well as the fastening device 21 (here the locking hook). In addition, a cable guide 27 in the form of a projection (shown dashed) can be provided.

In FIG. 1, the annular wall 26 serves, during manufacturing, to divide the mold hollow chamber into two hollow chambers 41 and 51, which correspond to the volumes of the respective sealing bodies. The hollow chamber 41 is delimited by the external surface of the wrapped conductor set 10, the molding tool 60 and the right-hand side surface of the wall 26 as shown in FIG. 1. This mold hollow chamber is filled with a foam of a first material during manufacturing, forming the sealing body 40. Said sealing body undergoes a fused connection with the side surface of the wall 26 which delimits the hollow chamber 41. The foam material for the sealing body 40 is configured, with regard to the main function thereof, for sealing the conductor set 10 in the longitudinal direction 12 (providing longitudinal water-tightness). Preferably, a suitable polyurethane (PUR) foam system, for example a 2K-PUR foam system, is used.

Due to the separating wall 26, a different foam material can be introduced on the opposing side of the sealing body 40 (the left-hand side in FIG. 1) into the hollow chamber 51 which forms the further (second) sealing body 50. Furthermore, the tool 60 has a sealing geometry in this region so that the sealing body 50 comprises a plurality of sealing lips 52. In this way, the further (second) sealing body 50 is formed which is configured with the sealing lips 52 for sealing against the bodywork panel 15, the material thereof being selected according to this function. For example, a TPE (TPE-S, TPE-U, TPE-V) or a polyurethane (PUR) foam system can be used.

In order also to enable repairs and the feeding of further conductors through the bushing, according to an optional configuration, as shown in FIG. 3, it is conceivable to provide a cut-away (recess) 43 parallel to the axial direction in the first sealing body 40, which penetrates said first sealing body completely in the longitudinal direction. This can be realized by placement of a core in the molding tool so that the volume of the core, which is later removed again, is not filled with foam.

The recess 43 can be configured narrowing toward the wall 26 for easier removal of the core. In addition, in this configuration, a recess 28 is provided in the wall 26 of the fastening body 20, completely penetrating said wall, whilst, as shown in FIG. 3, the second sealing body 50 remains unaltered in alignment with the recesses 43, 28. In order to introduce an additional conductor, the sealing body 50 can be perforated by introducing a sharp object into the recesses 43, 28 and a conductor can be threaded therethrough. Due to the elasticity of the second sealing body 50, it is conceivable that sufficient sealing is achieved in relation to the additionally introduced conductor in that the second sealing body 50 lies against and seals the introduced conductor.

Alternatively, it is also conceivable to provide a recess 53 in the second sealing body 50 comparable to the recess 43 and not to configure the recess 28 in the fastening body 20 to be continuous, but rather to leave a residual wall thickness in the order of, for example, approximately 2/10 mm, which can easily be penetrated with a pointed object and can also be provided with a predetermined breaking point. However, in this configuration, it may also be necessary to provide a conventional bushing in order to ensure sealing of the additionally introduced conductor set (not shown in FIG. 4).

The manufacturing of the bushing shown in FIGS. 1 to 4 will now be described in detail.

For this purpose, a molding tool with two tool halves 60 is used. With the tool halves 60 in their open state, the two partial segments 22, 24 of the fastening body 20 are inserted. Thereafter, the conductor set 10 which may previously be wrapped, is inserted into one of the tool halves or one of the segments 22 or 24. The tool or the tool halves 60 is/are then closed, the segments 22, 24 being brought together and possibly sealing relative to one another at the interfaces thereof by means, for example, of a groove (not shown). In the closed state, the outer surface 25 seals relative to the internal surface of the molding shell 60 and divides the mold chamber (cavity) into the hollow chambers 41, 51.

Thereafter, a foam material with a variety of properties can be introduced into the respective hollow chambers 41, 51 and foamed in order to form the sealing bodies 40, 50. Said introduction can also be carried out separately sequentially or with a delay. The foam material of both sealing bodies 40, 50 enters into fused connection with the wall 26 of the fastening body 20. The same applies to the connection between at least the sealing body 40 and the conductor set, preferably between the two sealing bodies 40, 50 and the conductor set 10.

Following removal of the bushing, the bushing is firmly connected to the conductor set 10.

For assembly, the conductor set is fed through the opening 14 of the bodywork panel 15 and the bushing is locked by means of the locking hook 21. By this means, the necessary pressing force for the sealing geometry 52 is ensured and sealing relative to the bodywork panel 15 is ensured. In addition, longitudinal water-tightness is assured by the sealing body 40 and the fastening body 20 assures simple and reliable assembly with small assembly forces and the possibility of a cable guide 27 having the necessary stiffness is realized.

Insertion of the segments 22, 24 and of the conductor set 10 can be carried out fully automatically by means of a robot, so that a method with a high degree of automation is achieved.

Figure 6:
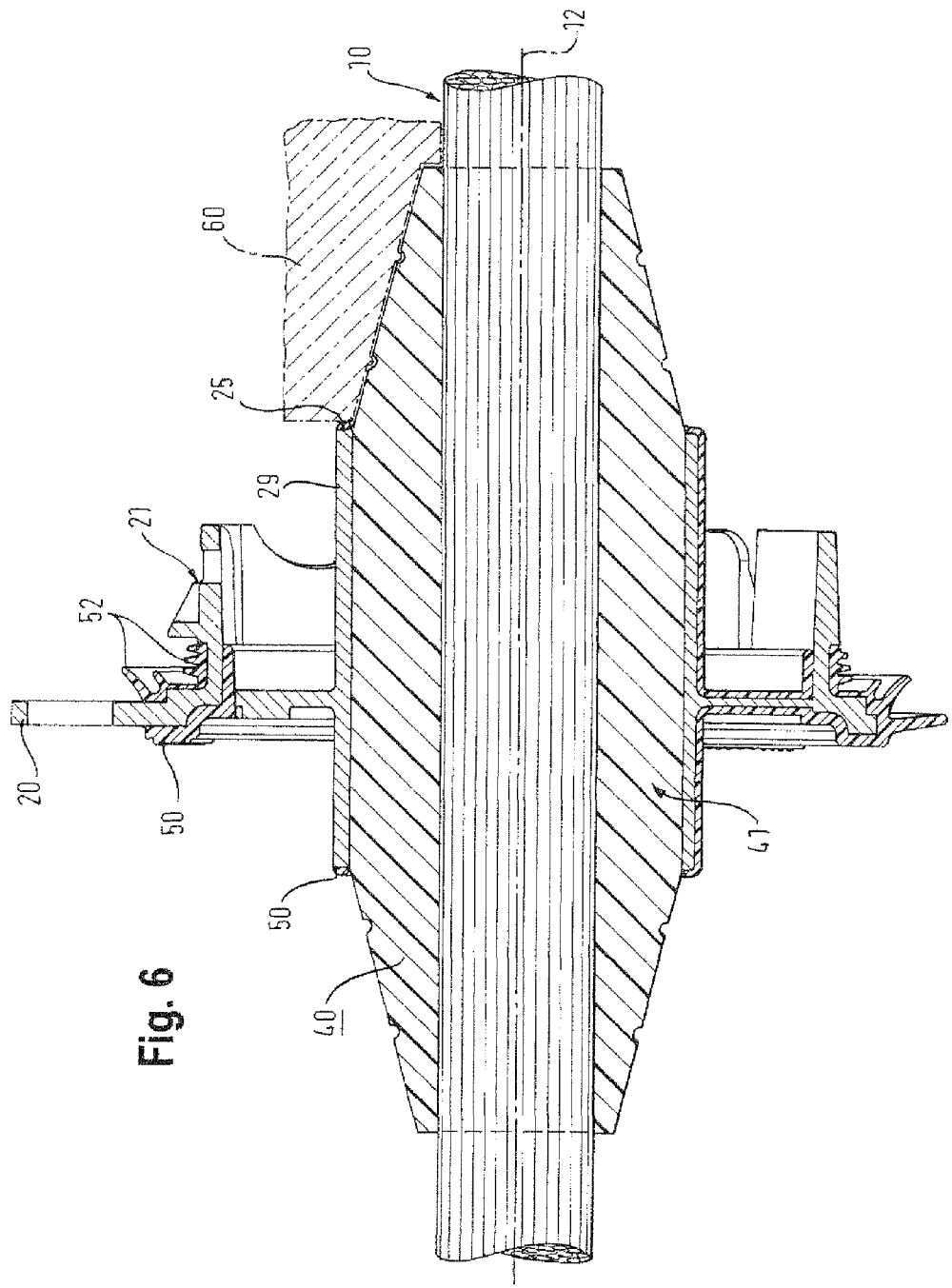
FIG. 6 shows a longitudinal section through the bushing of FIG. 5.

Alternatively to the embodiment shown in FIGS. 1 to 4, a bushing which accords to an alternative embodiment, as described in relation to FIGS. 5 and 6, is also conceivable.

In this embodiment, the fastening body 20 comprises a cylindrical wall 29, the central axis of which coincides with the longitudinal central axis 12 of the conductor set 10. The interior of the cylinder defines part of the hollow chamber 41 which predetermines the volume of the first sealing body 40. The cylinder hollow chamber is augmented during manufacturing by the mold halves 60. The end faces 25 of the cylindrical wall 29 each form the sealing region for sealing here relative to the mold halves 60 in the longitudinal and axial directions. In FIG. 1 above, however, sealing is carried out in the radial direction.

As distinct from the embodiment in FIGS. 1 to 4, the second sealing body 50 is not foamed and is not made in the same tool. Rather, the fastening body 20 is manufactured in an injection molding tool in a two-component molding process together with the second sealing body 50 which has the corresponding sealing geometry 52 for sealing relative to the bodywork panel 15 (not shown in FIG. 6). The second sealing body 50 is preferably made from a thermoplastic, for example, TPE, whereas the fastening body 20 is made from PC, ABS, PC-ABS or PA. The material of the sealing body 50 is fed via a channel in the fastening body to the surfaces 25 and forms a sealing surface there which serves to improve the seal relative to the tool 60. As an alternative to this, it is also conceivable to configure the surface 25 with a sealing contour, for example, one or more "sealing lips" made of the same material as the fastening body which, when the molding tool is closed, are pressed together and seal relative to the internal surface of the molding shell 60.

In the embodiment shown in FIGS. 5 and 6, also, a three-component part is provided which is configured in one piece, the foam material of the first sealing body 40 entering into fused connection with the internal surface of the cylindrical wall 29, so that the fastening body 20 is firmly connected to the sealing body 40. The same applies to the connection of the sealing body 40 to the conductor set 10. In this embodiment, similarly to the first embodiment above, the first sealing body 40 fulfils the function of longitudinal water-tightness along the longitudinal axis 12. In this regard, the material is selected accordingly. The fastening body 20 meets the requirement for simple assembly, that is, easy insertion of the bushing into the opening 14 in the bodywork panel 15 and possibly the necessary stiffness for a cable guide (see cable guide 27 in FIG. 1). The second sealing body 50 is designed and configured, with regard to the material thereof, for the function of sealing relative to the bodywork panel 15.

Otherwise, the configuration of the embodiments in. FIGS. 5 and 6 differs only insignificantly from that in FIGS. 1 to 4.

During manufacturing, the fastening body 20 is preferably inserted in one piece with the previously molded-on second sealing body 50 into one of the tool halves 60, once the conductor set 10 has been fed through the cylinder opening of the cylindrical wall 29.

Following closing of the tool halves 60, the cylindrical wall 29 together with the mold halves 60, defines a hollow chamber into which the foam material is injected and forms the sealing body 40, which by means of a fused connection with the conductor set 10 on one side and with the internal surface of the cylindrical wall 29, on the other side, forms a connection with the conductor set 10 and the fastening body 20 and thus also with the integrally configured second sealing body 50. Thus comparable advantages to those of the aforementioned embodiment are provided.

It should be understood that the above embodiments represent only a few possibilities for carrying out the present invention and that various derivations and modifications are conceivable. It is also conceivable for individual features of the individual embodiments to be combined, provided they do not contradict one another.

The invention claimed is:

1. A bushing for sealing a strand-shaped element in an opening in a wall, the bushing comprising;
   a foamed sealing body which completely surrounds the strand-shaped element and defines a volume;
   a fastening body for fastening the bushing to the wall, the fastening body being made of a different material from that of the sealing body, the volume defined by the sealing body is delimited at one side at least along a partial region of said side and is connected at least in fused manner along said partial region to the sealing body; and
   a further sealing body which is configured for sealing relative to the wall, wherein the further sealing body is made of a material different from that of the fastening body and is connected in fused manner to the fastening body.

2. A bushing according to claim 1, wherein the fastening body comprises, at least at one end of the partial region, a sealing region which, during manufacturing, seals relative to a molding tool, wherein the volume of the sealing body is predetermined by the fastening body and the molding tool.

3. A bushing according to claim 2, wherein the further sealing body extends into the sealing region and also constitutes the sealing means in the sealing region.

4. A bushing for sealing a strand-shaped element in an opening in a wall, the bushing comprising;
   a foamed sealing body which completely surrounds the strand-shaped element and defines a volume;
   a fastening body for fastening the bushing to the wall, the fastening body being made of a different material from that of the sealing body, the volume defined by the sealing body is delimited at one side at least along a partial region of said side and is connected at least in fused manner along said partial region to the sealing body; and
   a further sealing body which is configured for sealing relative to the wall, wherein the further sealing body is made of a different material from that of the sealing body.

5. A bushing according to claim 4, wherein the sealing body and the further sealing body are substantially separated from one another by the fastening body.

6. A bushing according to claim 5, wherein the fastening body comprises an annular wall, which extends radially and has a perforation for accommodating the strand-shaped element.

7. A bushing according to claim 6, wherein a penetration preparation for a further strand-shaped element is provided, which penetrates the sealing body, the further sealing body and the annular wall only partially in the axial direction.

8. A bushing according to claim 1, wherein the fastening body has a cylindrical wall which partially accommodates the sealing body and delimits the volume defined by the sealing body along the partial region in the radial direction.

9. A bushing according to claim 2, wherein the fastening body has a cylindrical wall which partially accommodates the sealing body and delimits the volume defined by the sealing body along the partial region in the radial direction, wherein the cylindrical wall has the sealing region at least at one end face.

10. A bushing according to claim 1, wherein the fastening body is assembled from at least two circular segments.

11. A bushing according to claim 4, wherein the further sealing body comprises a foamed sealing body.

12. A bushing according to claim 1, wherein the sealing body and the further sealing body are substantially separated from one another by the fastening body.

13. A bushing according to claim 12, wherein the fastening body comprises an annular wall, which extends radially and has a perforation for accommodating the strand-shaped element.

14. A bushing according to claim 13, wherein a penetration preparation for a further strand-shaped element is provided, which penetrates the sealing body, the further sealing body and the annular wall only partially in the axial direction.

15. A bushing according to claim 1, wherein the further sealing body comprises a foamed sealing body.

* * * * *